US012802676B2

(12) United States Patent
Yang

(10) Patent No.: US 12,802,676 B2
(45) Date of Patent: Nov. 17, 2026

(54) ACTIVE NOISE CONTROL METHOD AND SYSTEM FOR VEHICLE

(71) Applicants: Hyundai Motor Company, Seoul (KR); Kia Corporation, Seoul (KR)

(72) Inventor: Min Sik Yang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 174 days.

(21) Appl. No.: 18/795,959

(22) Filed: Aug. 6, 2024

(65) Prior Publication Data

US 2025/0191567 A1 Jun. 12, 2025

(30) Foreign Application Priority Data

Dec. 8, 2023 (KR) ........................ 10-2023-0177709

(51) Int. Cl.
*G10K 11/16* (2006.01)
*G10K 11/178* (2006.01)

(52) U.S. Cl.
CPC .. *G10K 11/17823* (2018.01); *G10K 11/17827* (2018.01); *G10K 11/17873* (2018.01); *G10K 2210/1081* (2013.01); *G10K 2210/12821* (2013.01); *G10K 2210/3027* (2013.01); *G10K 2210/501* (2013.01)

(58) Field of Classification Search
CPC ....... G10K 11/17823; G10K 11/17873; G10K 11/17827; G10K 2210/1081; G10K 2210/12821; G10K 2210/3027; G10K 2210/501
USPC ................................................ 381/71.4, 71.1
See application file for complete search history.

(56) References Cited

U.S. PATENT DOCUMENTS

2015/0071453 A1* 3/2015 Po .................... G10K 11/17817 381/71.11
2018/0012589 A1* 1/2018 MacNeille ....... G10K 11/17821

* cited by examiner

*Primary Examiner* — Ammar T Hamid
(74) *Attorney, Agent, or Firm* — Morgan, Lewis & Bockius LLP

(57) ABSTRACT

In an active noise control method and system for a vehicle, the active noise control method for a vehicle includes receiving, by a head unit, a noise signal detected by at least one wireless earphone in a vehicle, generating, by an amplifier (AMP) controller, a target output signal corresponding to a sound to be provided to an occupant, generating, by an acoustic design processor (ADP) controller operatively connected to the amplifier (AMP) controller, an opposite phase signal to a signal made by subtracting the target output signal from the noise signal, and transmitting, by the head unit, the generated opposite phase signal to the at least one wireless earphone.

19 Claims, 5 Drawing Sheets

ACTIVE NOISE CONTROL METHOD AND SYSTEM FOR VEHICLE

CROSS REFERENCE TO RELATED APPLICATION

The present application claims priority to Korean Patent Application No. 10-2023-0177709, filed on Dec. 8, 2023, the entire contents of which is incorporated herein for all purposes by this reference.

BACKGROUND OF THE PRESENT DISCLOSURE

Field of the Present Disclosure

The present disclosure relates to an active noise control system for a vehicle, and more particularly, to a method and system for providing active noise control to a passenger seated in a vehicle while wearing wireless earphones.

Description of Related Art

Active noise control (ANC) refers to a technology that blocks noise by inputting ambient noise through a microphone and then allowing a noise canceling circuit to generate canceling interference to cancel the ambient noise. Because a sound is a wave, it is generally possible to cancel or reduce undesired noise by generating acoustic canceling waves to interfere with the undesired audible noise in a canceling manner.

Recently, the above-mentioned functions have been applied to wireless earphones, headsets, or the like provided with noise canceling functions. Recently, active noise control functions, such as road active noise canceling (RANC), have been increasingly applied to newly released vehicles.

Meanwhile, the noise canceling has a technical limitation in that a position of the microphone and a position of the ear need to be close to each other at a high-frequency wavelength to optimize the performance of the noise canceling. However, in the vehicle, it is difficult to mount the microphone at a position close to the position of the ear of the occupant. Therefore, to cope with the difficulty, the occupant wears a wireless microphone to overcome the physical limitation.

However, when the passenger, who wears the wireless microphone, is seated in the vehicle, an active noise control system of the vehicle and the wireless microphone operate independently, which often inconveniences the passenger when the passenger utilizes the wireless microphone. For example, when the active noise control function of the wireless microphone is activated in the vehicle, the active noise control function recognizes all the sounds, such as alarm sounds, media sounds, and navigation notification sounds, which are generated by the systems in the vehicle, as noise, and removed the sounds. For the present reason, there is an inconvenience in that the wireless microphone worn by the passenger needs to be detached to ensure the safety of the vehicle.

Therefore, in the present field of the present disclosure, there is a need for technology to provide an in-vehicle active noise control system with improved noise canceling performance and provide necessary sounds to the occupant while removing unnecessary noise in the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an in-vehicle active noise control system with improved noise canceling performance.

Various aspects of the present disclosure are also directed to providing an active noise control system configured for providing necessary sounds to an occupant while removing unnecessary noise in a vehicle.

Various aspects of the present disclosure are also directed to providing an active noise control system configured for exhibiting noise canceling performance optimized for each seat in a vehicle.

Technical problems to be solved as an exemplary embodiment of the present disclosure are not limited to the above-mentioned technical problems, and other technical problems, which are not mentioned above, may be clearly understood from the following descriptions by those skilled in the art to which an exemplary embodiment of the present disclosure pertains.

An active noise control method for a vehicle according to various exemplary embodiments of the present disclosure includes receiving, by a head unit, a noise signal detected by at least one wireless earphone in a vehicle, generating, by an amplifier (AMP) controller, a target output signal corresponding to a sound to be provided to an occupant, generating, by an acoustic design processor (ADP) controller operatively connected to the amplifier (AMP) controller, an opposite phase signal to a signal made by subtracting the target output signal from the noise signal, and transmitting, by the head unit, the generated opposite phase signal to the at least one wireless earphone.

In the instant case, the active noise control method for a vehicle may further include: transmitting, by the AMP controller, the target output signal to a speaker.

In the instant case, the target output signal may include a plurality of different target output signals to be transmitted to seats in the vehicle, and the different target output signals may be transmitted to speakers respectively corresponding to the seats.

In the instant case, the active noise control method for a vehicle may further include: receiving, by the AMP controller, the noise signal from the head unit.

In the instant case, the active noise control method for a vehicle may further include: receiving, by the ADP controller, information on an acceleration from an acceleration sensor and applying the information on the acceleration to the noise signal.

In the instant case, the transmitting of the generated opposite phase signal to the at least one wireless earphone may include transmitting the opposite phase signal to the noise signal, which is detected by the wireless earphone corresponding to each seat, to the wireless earphone corresponding to each seat.

In the instant case, the target output signal may include at least one of an alarm sound, a navigation notification sound, and a sound source in the vehicle and combinations thereof.

Meanwhile, an active noise control system for a vehicle according to various exemplary embodiments of the present disclosure includes: a head unit configured to receive a noise signal detected by at least one wireless earphone operatively connected to the head unit in a vehicle; an amplifier (AMP) controller configured to generate a target output signal corresponding to a sound to be provided to an occupant of the vehicle; and an acoustic design processor (ADP) controller configured to generate an opposite phase signal to a signal made by subtracting the target output signal from the noise signal, in which the head unit transmits the generated opposite phase signal to the at least one wireless earphone.

In the instant case, the AMP controller may be configured to transmit the target output signal to a speaker.

In the instant case, the target output signal may include a plurality of different target output signals to be transmitted to seats in the vehicle, and the different target output signals may be transmitted to speakers respectively corresponding to the seats.

In the instant case, the AMP controller is configured to receive the noise signal from the head unit.

In the instant case, the ADP controller is configured to receive information on an acceleration from an acceleration sensor and apply the information on the acceleration to the noise signal.

In the instant case, the head unit may transmit the opposite phase signal to the noise signal, which is detected by the wireless earphone corresponding to each seat, to the wireless earphone corresponding to each seat.

In the instant case, the target output signal may include at least one of an alarm sound, a navigation notification sound, and a sound source in the vehicle and combinations thereof.

Various aspects of the present disclosure are directed to providing the in-vehicle active noise control system with the improved noise canceling performance.

Furthermore, it is possible to provide the necessary sound to the occupant while removing unnecessary noise in the vehicle.

Furthermore, it is possible to exhibit the noise canceling performance optimized for each seat in the vehicle.

Furthermore, it is possible to provide an improved human-machine interface by providing an operation algorithm that smartly operates in conjunction with the vehicle system when the passenger is seated in the vehicle while wearing the wireless earphones.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
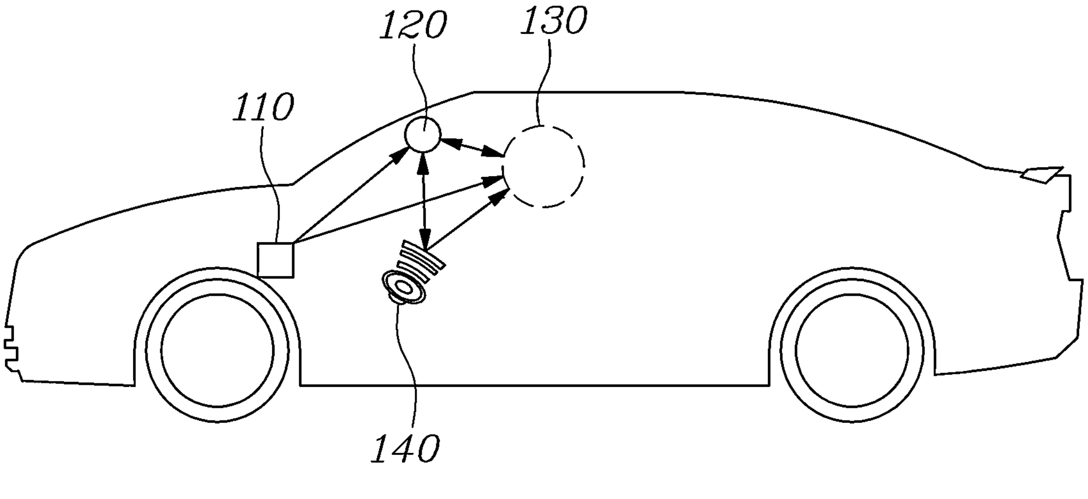
FIG. 1 is a view exemplarily illustrating an example of a general active noise control (ANC) system.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the present disclosure will be described in detail with reference to the accompanying drawings. Here, repeated descriptions and detailed descriptions of publicly-known functions and configurations, which may unnecessarily obscure the subject matter of the present disclosure, will be omitted. Exemplary embodiments of the present disclosure are provided to more completely explain in an exemplary embodiment of the present disclosure to a person with ordinary skill in the art. Therefore, shapes and sizes of elements illustrated in the drawings may be exaggerated for a more apparent description.

Hereinafter, various exemplary embodiments of the present disclosure will be described in detail with reference to the accompanying drawings.

FIG. 1 is a view exemplarily illustrating an example of a general active noise control (ANC) system.

With reference to FIG. 1, a general active noise control (ANC) system includes an acceleration sensor 110, microphones 120, an ADP controller 130, and speakers 140.

The acceleration sensor 110 detects vibration of a vehicle body from a road surface.

In the instant case, the acceleration sensor 110 may be provided on a floor of the vehicle body of the vehicle.

In the instant case, the acceleration sensor 110 may include a plurality of acceleration sensors. For example, four acceleration sensors may be provided on the floor of the vehicle body of the vehicle.

The microphone 120 detects noise transmitted to the interior of the vehicle from the outside of the vehicle.

In the instant case, the microphone 120 may be provided on a ceiling of the vehicle.

In the instant case, the microphones 120 may include a plurality of microphones. For example, eight microphones may be provided on the ceiling of the vehicle.

The ADP controller 130 is configured to control noise canceling in the vehicle. For example, the ADP controller 130 generates a sound signal capable of canceling noise, which is transmitted from the outside of the vehicle, based on sensing information detected by the acceleration sensor 110 and noise received by the microphone 120.

The speaker 140 outputs the sound signal which is generated by the ADP controller 130 and is capable of canceling noise transmitted from the outside of the vehicle.

In the instant case, the speakers 140 may be provided in a plurality of regions in the vehicle. For example, the speakers 140 may be provided in four doors in the vehicle. Furthermore, the speaker 140 may further include a center speaker and sub-woofer speakers.

Figure 2:
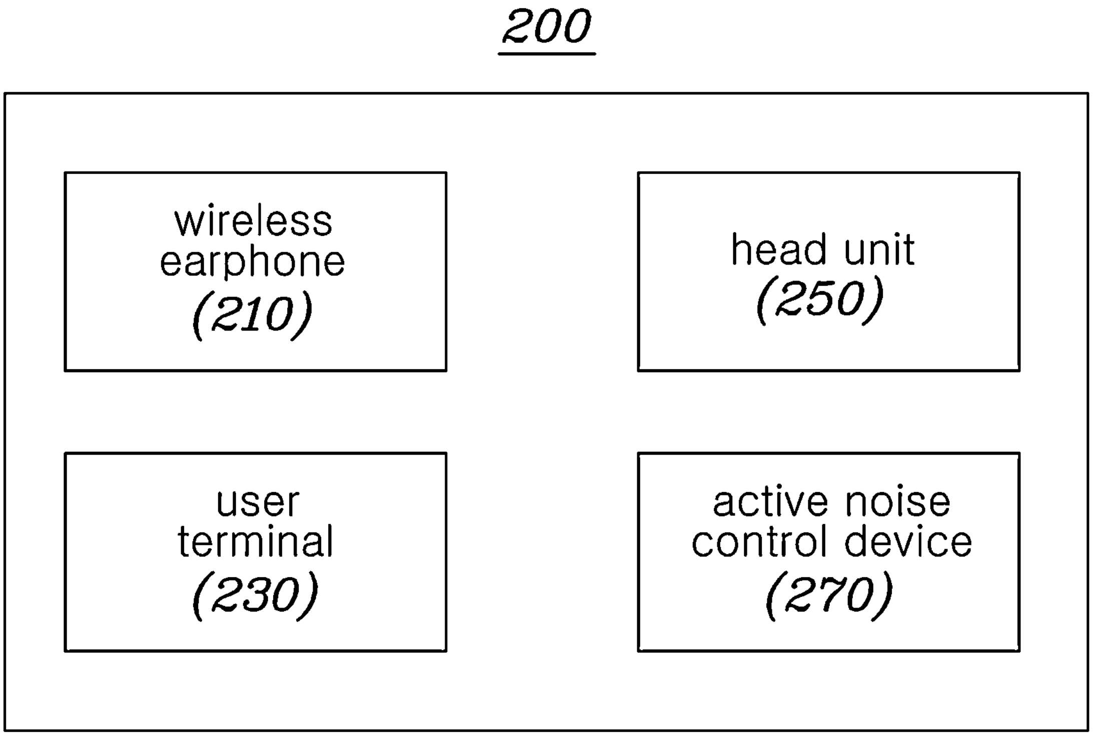
FIG. 2 is a view schematically illustrating a configuration of an active noise control system according to various exemplary embodiments of the present disclosure.

FIG. 2 is a view schematically illustrating a configuration of an active noise control system according to various exemplary embodiments of the present disclosure.

With reference to FIG. 2, an active noise control system 200 according to the exemplary embodiment includes wireless earphones 210, user terminals 230, head units 250, and an active noise control device 270.

The wireless earphone 210 transfers information on operating modes to the head unit 250 through the user terminal 230. The wireless earphone 210 receives an alarm sound, a navigation notification sound, or a sound source in the vehicle from the head unit 250 and outputs the sounds.

Furthermore, the wireless earphone 210 may be provided with a microphone and transmit a sound signal, which is received from the wireless earphone 210, to the head unit 250.

In the instant case, the operating modes may include a noise canceling mode for blocking external noise, a transparency mode for transmitting external noise, and a neutral mode for outputting a sound regardless of external noise.

In the instant case, the wireless earphone 210 may perform communication with the user terminal 230 or the head unit 250 by use of Bluetooth communication. Alternatively, the wireless earphone 210 may perform communication by use of other wireless communication methods such as Wi-Fi.

In the instant case, a user may play an alarm sound and a navigation notification sound in the vehicle through an audio player in the head unit 250 and simultaneously play sound sources such as MP3 and radio.

The user terminal 230 is connected to the head unit 250 and transfers information on the connection of the wireless earphone 210 and information on the operating mode to the head unit 250.

In the instant case, the user terminal 230 may include a plurality of user terminals, and the plurality of user terminals may be simultaneously connected to the head unit 250 in each seat.

In the instant case, the user terminal 230 may transfer, to the head unit 250, information related to which seat the terminal is positioned in and information related to which terminal the wireless earphone 210 is connected to. Therefore, the head unit 250 may identify the presence or absence of the wireless earphone 210 connected for each seat.

In the instant case, the user terminal 230 may be applied to various terminals, such as a smart phone, a portable terminal, a mobile terminal, a foldable terminal, a personal digital assistant (PDA), a portable multimedia player (PMP) terminal, a telematics terminal, a navigation terminal, a personal computer, a laptop computer, a slate PC, a tablet PC, an ultrabook, a wearable device (for example, including a watch-type terminal (smartwatch), a glass-type terminal (Smart Glass), and a head mounted display (HMD)), a Wibro terminal, an Internet Protocol Television (IPTV) terminal, a smart TV, a digital broadcasting terminal, an audio video navigation (AVN) terminal, an audio/video (A/V) system, a flexible terminal, and a digital signage device. In the instant case, the transfer and reception of the information between the wireless earphone 210 and the user terminal 230 or between the head unit 250 and the user terminal 230 may be performed by applications, Internet browsers, or the like provided in the user terminal 230.

The head unit 250 receives information on the connection of the wireless earphone 210 and information on the operating mode from the user terminal 230 and transfers the information to the active noise control device 270. The head unit 250 receives a sound signal detected by the microphone of the wireless earphone 210, receives, from the active noise control device 270, a sound signal to be outputted from the wireless earphone 210, and transmits the sound signals to the wireless earphone 210.

The active noise control device 270 receives information on the connection of the wireless earphone 210 and information on the operating mode from the head unit 250 and transmits a sound signal, which is to be outputted from the wireless earphone 210, to the head unit 250.

In the instant case, the sound signals, which are to be outputted from the wireless earphone 210, may include an opposite phase signal to external noise, and an alarm sound, a navigation notification sound, or a sound source in the vehicle.

Figure 3:
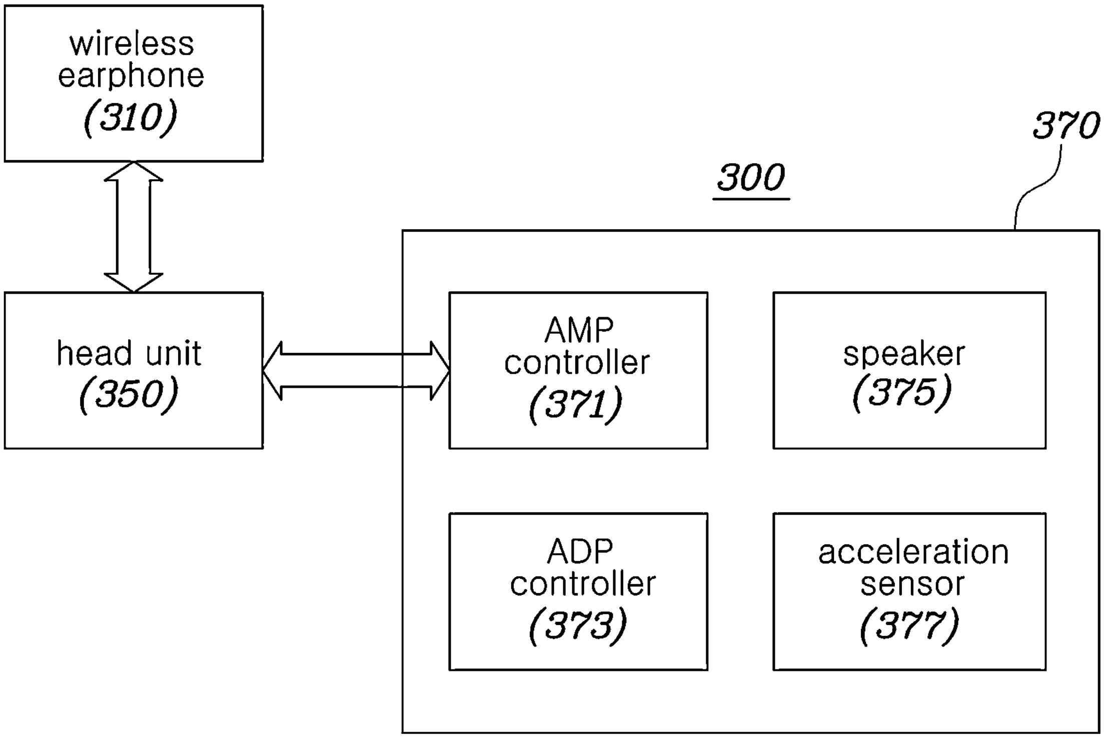
FIG. 3 is a view schematically illustrating a configuration of an active noise control system according to various exemplary embodiments of the present disclosure.

FIG. 3 is a view schematically illustrating a configuration of an active noise control system according to various exemplary embodiments of the present disclosure.

With reference to FIG. 3, an active noise control system 300 according to the exemplary embodiment includes wireless earphones 310, head units 350, and an active noise control device 370.

The wireless earphone 310 detects, in real time, a sound in the vehicle by an embedded microphone and transmits the sound to the head unit 350.

In the instant case, the wireless earphone 310 may perform communication with the head unit 350 by use of Bluetooth communication. Alternatively, the wireless earphone 310 may perform communication by use of other wireless communication methods such as Wi-Fi.

Furthermore, the wireless earphone 310 may receive, from the head unit 350, an opposite phase signal to external noise, and an alarm sound, a navigation notification sound, or a sound source in the vehicle and output the signal and sound.

The head unit 350 receives a sound signal detected by the microphone of the wireless earphone 310, receives, from the active noise control device 370, a sound signal to be outputted from the wireless earphone 310, and transmits the sound signals to the wireless earphone 310.

The active noise control device 370 receives, from the head unit 350, a sound signal detected by the microphone of the wireless earphone 310, generates a sound signal to be outputted from the wireless earphone 310, and transmits the sound signal to the head unit 350.

The active noise control device 370 includes an amplifier (AMP) controller 371, an acoustic design processor (ADP) controller 373, speakers 375, and an acceleration sensor 377.

The AMP controller 371 adds a sound signal, which needs to be actually outputted from the wireless earphone 310 connected to the vehicle for each seat, to an opposite phase signal to external noise generated by the acoustic design processor (ADP) controller 373 and transmits the resultant sound signal to the head unit 350.

Furthermore, the AMP controller 371 receives, from the head unit 350, a sound signal detected by the microphone of the wireless earphone 310 and transmits the sound signal to the ADP controller 373.

The ADP controller 373 receives, from the AMP controller 371, a sound signal detected by the microphone of the wireless earphone 310, generates an opposite phase signal to external noise based on the sound signal, and transmits the generated opposite phase signal to the external noise to the AMP controller 371.

In the instant case, the ADP controller 373 may receive information on the acceleration from the acceleration sensor 377 and generate an opposite phase signal to external noise based on the sound signal, which is detected by the microphone of the wireless earphone 310, and the information on the acceleration received from the acceleration sensor 377.

The speaker 375 receives, from the AMP controller 371, an alarm sound, a navigation notification sound, or a sound source in the vehicle and outputs the sound.

In the instant case, the speakers 375 may be provided in a plurality of regions in the vehicle. For example, the speakers 375 may be provided in four doors in the vehicle. Furthermore, the speaker 375 may further include a center speaker and sub-woofer speakers.

The acceleration sensor 377 detects the acceleration of the vehicle and transmits the acceleration to the ADP controller 373.

Figure 4:
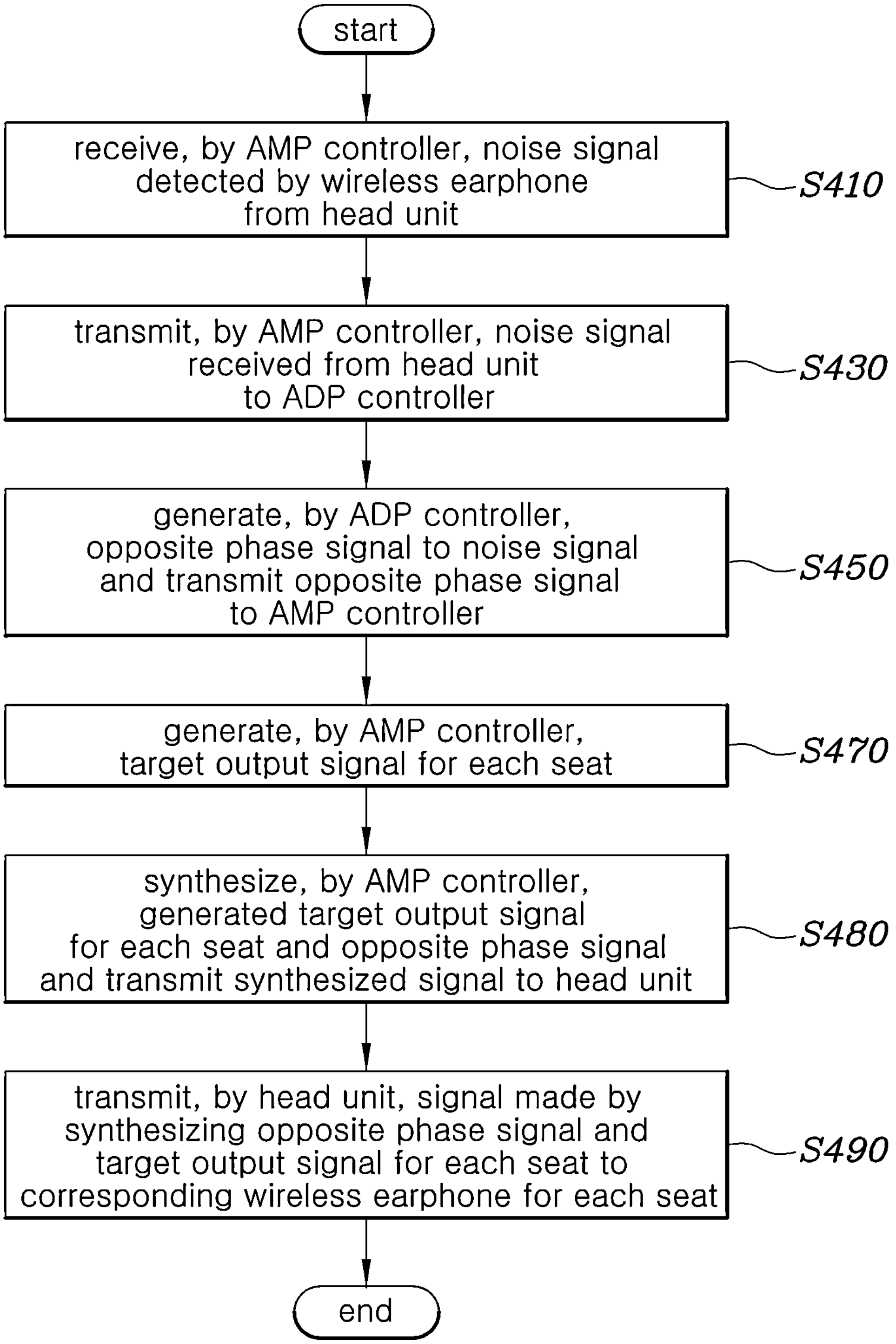
FIG. 4 is a view exemplarily illustrating an active noise control method for a vehicle according to the exemplary embodiment of the present disclosure.

FIG. 4 is a view exemplarily illustrating an active noise control method for a vehicle according to the exemplary embodiment of the present disclosure.

The active noise control method according to the exemplary embodiment may be performed by the active noise control system according to the exemplary embodiment in FIG. 3.

An example will be described in which the active noise control method according to the exemplary embodiment deactivates the output of the speaker 375 and outputs a sound from the wireless earphone 310.

The exemplary embodiment may be performed when the noise canceling mode for blocking external noise by the wireless earphone 310 is set.

With reference to FIG. 4, the AMP controller 371 receives, from the head unit 350, a noise signal detected by the wireless earphone 310 (S410).

In the instant case, the wireless earphones 310 may include a plurality of wireless earphones. The noise signal, which is detected by the wireless earphone 310 and received by the AMP controller 371 from the head unit 350, may be defined by Equation 1 below.

$$D(n) = d1(n) + d2(n) + d3(n) + \dots \quad \text{[Equation 1]}$$

In Equation 1, D(n) represents a signal made by summing up all the noise signals detected by all of the plurality of wireless earphones that forms the wireless earphones 310, and d1(n), d2(n), and d3(n) respectively represent the noise signals detected by the wireless earphones that form the wireless earphones 310.

Therefore, the noise signal, which is detected by the wireless earphone 310 and received by the AMP controller 371 from the head unit 350, may be defined as D(n).

Furthermore, the AMP controller 371 transmits the noise signal, which is received from the head unit 350, to the ADP controller 373 (S430).

Furthermore, the ADP controller 373 generates the opposite phase signal in response to the noise signal received from the AMP controller 371 and transmits the opposite phase signal to the AMP controller 371 (S450).

In the instant case, the opposite phase signal generated by the ADP controller 373 may be defined by Equation 2 below.

$$D'(n) = d'1(n) + d'2(n) + d'3(n) + \dots \quad \text{[Equation 2]}$$

In Equation 2, D'(n) represents the opposite phase signal to D(n), i.e., the opposite phase signal to the noise signal detected by the wireless earphone 310, d'1(n) represents the opposite phase signal to d1(n), and d2'(n) and d3'(n) respectively represent the noise signals detected by the wireless earphones that form the wireless earphones 310.

Furthermore, the AMP controller 371 generates a target output signal for each seat.

In the instant case, the target output signal for each seat may correspond to a sound to be provided to the occupant seated in each seat.

For example, the target output signal for each seat may include at least one of an alarm sound, a navigation notification sound, and a sound source in the vehicle and combinations thereof.

In the instant case, the target output signal for each seat may be defined by Equation 3 below.

$$X(n) = X1(n) + X2(n) + X3(n) + \dots \quad \text{[Equation 3]}$$

In Equation 3, X(n) represents a signal made by summing up all the target output signals for the seats, and X1(n), X2(n), and X3(n) represent the target output signals for the seats. For example, in case that four seats are present in the vehicle and different target signals are outputted to the four seats, different target output signals of X1(n), X2(n), X3(n), and X4(n) may be generated.

Furthermore, the AMP controller 371 synthesizes the target output signals for the seats generated in step S470 and the opposite phase signal received from the ADP controller 373 and transmits the synthesized signal to the head unit 350 (S480).

In the instant case, the signal, which is made by synthesizing the opposite phase signal received from the ADP controller 373 and the target output signals for all the seats, may be defined by Equation 4 below.

$$Y(n) = X(n) + D'(n) \quad \text{[Equation 4]}$$

In Equation 4, Y(n) represents the signal made by synthesizing the signal, which is made by summing up the target output signals for all the seats, and the opposite phase signals to the noise signals detected by all the earphones, X(n) represents the signal made by summing up all the target output signals for the seats, and D'(n) represents the opposite phase signal to D(n), i.e., the opposite phase signal to the noise signal detected by the wireless earphone 310.

In the instant case, Y(n) may be a sum of signals to be transmitted to the seats and defined by Equation 5 below.

$$Y(n) = Y1(n) + Y2(n) + Y3(n) + \dots \quad \text{[Equation 5]}$$

In Equation 5, Y(n) represents the signal made by synthesizing the signal, which is made by summing up the target output signals for all the seats, and the opposite phase signals to the noise signals detected by all the earphones, i.e., represents the signal made by summing up the signals to be transmitted to the wireless earphones, and Y1(n), Y2(n), and Y3(n) represent the signal made by synthesizing the target output signals for the seats and the opposite phase signals to the noise signals detected by the earphones.

Furthermore, the head unit 350 transmits the signal, which is made by synthesizing the opposite phase signal and the target output signal for each seat, to the corresponding wireless earphone for each seat (S490).

For example, in case that four seats are present in the vehicle and the signals are transmitted to the occupants seated in the respective seats and wearing different earphones, the four different signals of Y1(n), Y2(n), Y3(n), and Y4(n) may be transmitted.

Therefore, in the vehicle, the signals, which are made by applying noise canceling to the target output signals to be transmitted to the wireless earphones, may be provided to the occupants seated in the respective seats.

In an exemplary embodiment of the present disclosure, each of the AMP controller 371 and the ADP controller 373 may be implemented by a processor (e.g., computer, microprocessor, CPU, ASIC, circuitry, logic circuits, etc.) or by a single processor.

Figure 5:
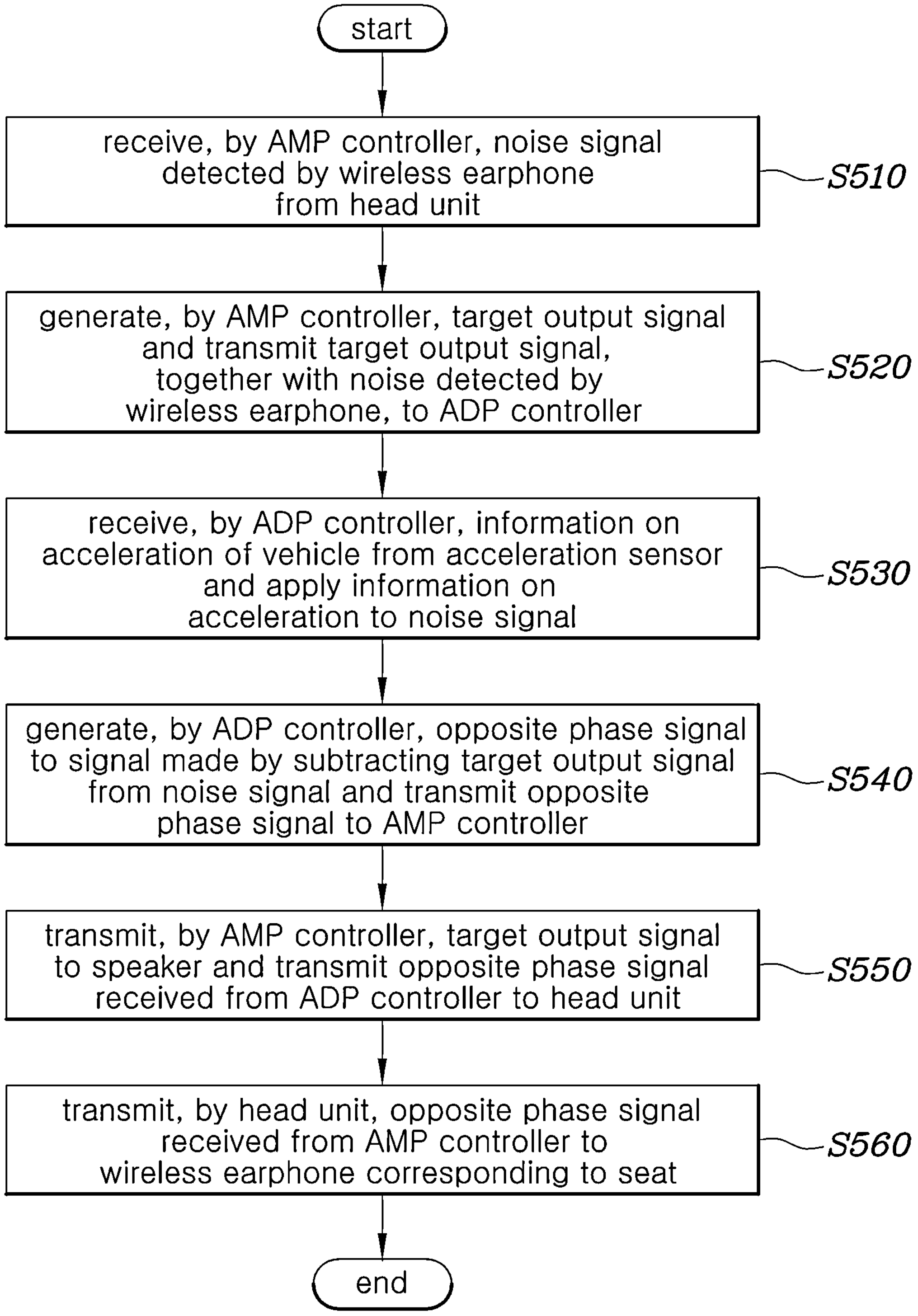
FIG. 5 is a view exemplarily illustrating an active noise control method for a vehicle according to various exemplary embodiments of the present disclosure.

FIG. 5 is a view exemplarily illustrating an active noise control method for a vehicle according to various exemplary embodiments of the present disclosure.

The active noise control method according to the exemplary embodiment may be performed by the active noise control system according to the exemplary embodiment in FIG. 3.

An example will be described in which the active noise control method according to the exemplary embodiment activates the output of the speaker 375 and applies the noise canceling by the wireless earphones 310, except for the sound outputted from the speaker 375. In the instant case, the wireless earphones 310 may output sounds to be outputted from the user terminals connected to the wireless earphones 310.

The exemplary embodiment may be performed when the noise canceling mode for blocking external noise by the wireless earphone 310 is set.

With reference to FIG. 5, the AMP controller 371 receives, from the head unit 350, a noise signal detected by the wireless earphone 310 (S510).

In the instant case, the wireless earphones 310 may include a plurality of wireless earphones. The noise signal, which is detected by the wireless earphone 310 and received by the AMP controller 371 from the head unit 350, may be defined as D(n) in Equation 1.

Furthermore, the AMP controller 371 generates the target output signal and transmits the target output signal, together with the noise detected by the wireless earphone 310, to the ADP controller 373 (S520).

In the instant case, the AMP controller 371 may be configured to generate the different target output signals for the seats, and the signal made by summing up all the target output signals for the seats may be transmitted to the ADP controller 373.

In the instant case, the signal made by summing up all the target output signals for the seats may be defined as X(n) in Equation 3, and the target output signals for the seats may be respectively defined as X1(n), X2(n), X3(n), . . . .

Furthermore, the ADP controller 373 receives information on the acceleration of the vehicle from the acceleration sensor 377 and applies the information on the acceleration to the noise signal (S530).

For example, the ADP controller 373 may be configured to generate a noise signal corrected by applying the information on the acceleration of the vehicle to the noise signal detected by the wireless earphone 310 and then generate an opposite phase signal to the corrected noise signal instead of an opposite phase signal to the noise signal detected by the wireless earphone 310.

Furthermore, the ADP controller is configured to generate an opposite phase signal to a signal made by subtracting the target output signal from the noise signal and transmits the opposite phase signal to the AMP controller (S540).

In the instant case, the ADP controller may be configured to generate an opposite phase signal to a signal made by subtracting the target output signal for each seat from the noise signal of the wireless earphone corresponding to each seat.

In the instant case, the opposite phase signal to the signal made by subtracting the target output signal for each seat from the noise may be defined by Equation 6 below.

$$E'(n) = \{D(n) - X(n)\} \quad \text{[Equation 6]}$$

In Equation 6, E'(n) represents the opposite phase signal to the signal made by subtracting the target output signal for each seat from the noise signals detected by all the earphones, D(n) represents the noise signals detected by all the wireless earphones 310, and X(n) represents the signal made by summing up all the target output signals for the seats.

In the instant case, E'(n) may be generated by applying the signal, which is made by applying the acceleration information, which is received from the acceleration sensor 377, to the noise signals detected by all the wireless earphones 310, to D(n).

In the instant case, as shown in Equation 7 below, E'(n) may be a sum of the signals to be transmitted to the seats, respectively.

$$E'(n) = E'1(n) + E'2(n) + E'3(n) + \dots \quad \text{[Equation 7]}$$

In Equation 7, E'(n) represents the opposite phase signal to the signal made by subtracting the target output signal for each seat from the noise signals detected by all the earphones, i.e., represents a sum of the signals to be transmitted to all the earphones, and E'1(n), E'2(n), and E'3(n) represent the opposite phase signals to the signals made by subtracting the target output signals for the seats from the noise signals detected by the respective earphones.

Furthermore, the AMP controller 371 transmits the target output signal to the speaker 375 and transmits the opposite phase signal, which is received from the ADP controller 373, to the head unit 350 (S550).

In the instant case, the AMP controller 371 may transmit the target output signal for each seat to the speaker 375 corresponding to the seat.

Furthermore, the head unit 350 transmits the opposite phase signal, which is received from the AMP controller 371, to the wireless earphone 310 corresponding to the seat (S560).

In the instant case, the head unit 350 may transmit the opposite phase signal to the noise signal, which is detected by the wireless earphone corresponding to the seat, to the wireless earphone corresponding to the seat.

For example, in case that four seats are present in the vehicle and the signals are transmitted to the occupants seated in the respective seats and wearing different earphones, the four different signals of E'1(n), E'2(n), E'3(n), and E'4(n) may be transmitted.

Therefore, in the vehicle, among the noise canceling signals to be transmitted to the respective wireless earphones, the target output signals, which are outputted from the respective speakers and are not recognized as noise, may be provided to the occupants seated in the respective seats.

Therefore, various aspects of the present disclosure are directed to providing the in-vehicle active noise control system with the improved noise canceling performance.

Furthermore, it is possible to provide the necessary sound to the occupant while removing unnecessary noise in the vehicle.

Furthermore, it is possible to exhibit the noise canceling performance optimized for each seat in the vehicle.

Furthermore, it is possible to provide an improved human-machine interface by providing an operation algorithm that smartly operates in conjunction with the vehicle system when the passenger is seated in the vehicle while wearing the wireless earphones.

Meanwhile, the present disclosure described above may be implemented as a computer-readable code on a medium on which a program is recorded. The computer-readable medium includes all kinds of storage devices for storing data readable by a computer system. Examples of computer-readable media include hard disk drives (HDDs), solid state disks (SSDs), silicon disk drives (SDDs), ROMs, RAMs, CD-ROMs, magnetic tapes, floppy discs, and optical data storage devices. Therefore, it should be appreciated that the detailed description is interpreted as being illustrative in every aspects, not restrictive. The scope of the present disclosure should be determined based on the reasonable interpretation of the appended claims, and all of the modifications within the equivalent scope of the present disclosure belong to the scope of the present disclosure.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An active noise control method for a vehicle, the active noise control method comprising:

receiving, by a head unit, a noise signal detected by at least one wireless earphone operatively connected to the head unit in the vehicle;

generating, by an amplifier (AMP) controller, a target output signal corresponding to a sound to be provided to an occupant of the vehicle;

generating, by an acoustic design processor (ADP) controller operatively connected to the amplifier (AMP) controller, an opposite phase signal to a signal made by subtracting the target output signal from the noise signal; and transmitting, by the head unit, the generated opposite phase signal to the at least one wireless earphone and providing the sound including the generated opposite phase signal.

2. The active noise control method of claim 1, further including:

transmitting, by the AMP controller, the target output signal to a speaker.

3. The active noise control method of claim 2, wherein the speaker is in plural and wherein the target output signal includes a plurality of different target output signals to be transmitted to the seats in the vehicle, and the different target output signals are transmitted to the speakers respectively corresponding to the seats.

4. The active noise control method of claim 1, further including:

receiving, by the AMP controller, the noise signal from the head unit.

5. The active noise control method of claim 1, further including:

receiving, by the ADP controller, information on an acceleration from an acceleration sensor and applying the information on the acceleration to the noise signal.

6. The active noise control method of claim 1, wherein the transmitting of the generated opposite phase signal to the at least one wireless earphone includes transmitting the opposite phase signal to the noise signal, which is detected by the at least one wireless earphone corresponding to each seat, to the at least one wireless earphone corresponding to each seat.

7. The active noise control method of claim 2, wherein the target output signal includes at least one of an alarm sound, a navigation notification sound, and a sound source in the vehicle and combinations thereof.

8. An active noise control system for a vehicle, the active noise control system comprising:

a head unit configured to receive a noise signal detected by at least one wireless earphone operatively connected to the head unit in the vehicle;

an amplifier (AMP) controller operatively connected to the head unit and configured to generate a target output signal corresponding to a sound to be provided to an occupant of the vehicle; and an acoustic design processor (ADP) controller operatively connected to the amplifier (AMP) controller and configured to generate an opposite phase signal to a signal made by subtracting the target output signal from the noise signal, wherein the head unit transmits the generated opposite phase signal to the at least one wireless earphone and provides the sound including the generated opposite phase signal.

9. The active noise control system of claim 8, wherein the AMP controller is further configured for transmitting the target output signal to a speaker.

10. The active noise control system of claim 9, wherein the speaker is in plural and wherein the target output signal includes a plurality of different target output signals to be transmitted to the seats in the vehicle, and the different target output signals are transmitted to the speakers respectively corresponding to the seats.

11. The active noise control system of claim 8, wherein the AMP controller is further configured to receive the noise signal from the head unit.

12. The active noise control system of claim 8, wherein the ADP controller is further configured to receive information on an acceleration from an acceleration sensor and to apply the information on the acceleration to the noise signal.

13. The active noise control system of claim 8, wherein the head unit transmits the opposite phase signal to the noise signal, which is detected by the at least one wireless earphone corresponding to each seat, to the at least one wireless earphone corresponding to each seat.

14. The active noise control system of claim 9, wherein the target output signal includes at least one of an alarm sound, a navigation notification sound, and a sound source in the vehicle and combinations thereof.

15. An active noise control system for a vehicle, the active noise control system comprising:

a processor; and a non-transitory storage medium containing program instructions, wherein the processor is configured to, by executing the program instructions:

receive a noise signal detected by at least one wireless earphone in a vehicle;

generate a target output signal corresponding to a sound to be provided to an occupant of the vehicle; and generate an opposite phase signal to a signal made by subtracting the target output signal from the noise signal, transmit the generated opposite phase signal to the at least one wireless earphone and providing the sound including the generated opposite phase signal.

16. The active noise control system of claim 15, wherein the processor is further configured for transmitting the target output signal to a speaker.

17. The active noise control system of claim 16, wherein the speaker is in plural and wherein the target output signal includes a plurality of different target output signals to be transmitted to the seats in the vehicle, and the different target output signals are transmitted to the speakers respectively corresponding to the seats.

18. The active noise control system of claim 15, wherein the processor is further configured to receive information on an acceleration from an acceleration sensor and to apply the information on the acceleration to the noise signal.

19. The active noise control system of claim 15, wherein the target output signal includes at least one of an alarm sound, a navigation notification sound, and a sound source in the vehicle and combinations thereof.

* * * * *